Figure 1:
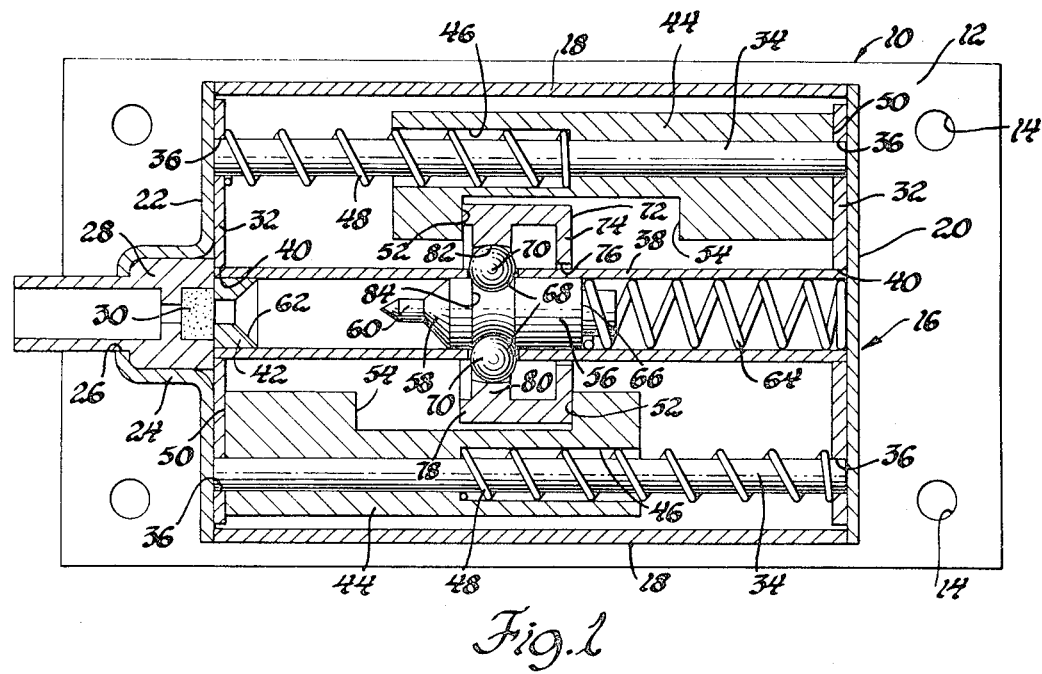

United States Patent [19]
Prachar

[11] 3,727,575
[45] Apr. 17, 1973

[54] BIDIRECTIONAL SENSOR
[75] Inventor: Otakar P. Prachar, Santa Barbara, Calif.
[73] Assignee: General Motors Corporation, Detroit, Mich.
[22] Filed: Nov. 11, 1971
[21] Appl. No.: 197,736

[52] U.S. Cl. .......116/114 AH, 73/492, 116/114 AH, 280/150 AB
[51] Int. Cl. ............................................G01d 21/00
[58] Field of Search ......................74/2; 280/150 AB; 116/114 AH; 73/492

[56] References Cited
UNITED STATES PATENTS
2,351,607  6/1944  Grant, Jr. et al. ..........................74/2

Primary Examiner—Milton Kaufman
Attorney—W. E. Finken et al.

[57] ABSTRACT

A bidirectional sensor includes a rectangular housing mounted on a base plate. A hollow cylindrical guide tube extends between opposite end walls of the housing and slidably receives an operator therewithin. A coil spring seating between one end wall and the operator biases the operator toward the other end wall to actuated position wherein the operator engages a primer or closes an electrical circuit. Three equally spaced radial openings in the wall of the tube receive respective balls which seat in a circumferential arcuate groove of the operator to detent the operator against movement under the spring bias. The balls are constrained against movement outward of the openings by a cylindrical detent member which surrounds the operator and has a first cylindrical shoulder thereof seating the balls in the operator groove and a second cylindrical shoulder slidable along the guide tube. A pair of rods extend parallel to the guide tube axis and slidably mount rectangularly shaped seismic masses, each having spaced shoulders provided by a cutout in the mass. Respective springs bias the masses opposite each other and into engagement with a respective end wall of the housing. One shoulder of each mass engages the detent member, generally diametrically and axially opposite of the other shoulder, to locate the detent member in detent position. Should either mass move against its bias under an acceleration pulse of predetermined amplitude and time, the other shoulder will engage the detent member to move the detent member out of engagement with the one shoulder of the other mass and move the first shoulder of the detent member out of engagement with the balls to release the operator.

4 Claims, 2 Drawing Figures

PATENTED APR 17 1973  3,727,575

INVENTOR.
Otakar P. Prachar
BY
Herbert Furman
ATTORNEY

BIDIRECTIONAL SENSOR

This invention relates generally to bidirectional sensors and more particularly to bidirectional sensors of the type including a pair of seismic masses which move linearly relative to a detented operator and release the operator for movement to an actuated position upon movement of either mass under an acceleration pulse of predetermined amplitude and time.

One feature of this invention is that the seismic masses are respectively mounted for linear movement in directions opposite each other and are respectively biased against such movement, with movement of either mass against its bias releasing a detent for the operator. Another feature is that the masses collectively locate the detent in detent position and movement of either mass releases the detent. A further feature is that the masses move in directions generally parallel to the direction of movement of the operator and include spaced shoulders arranged in respective pairs, one pair coacting to position the detent in detent position and either of the other pair moving the detent coaxial of the operator to released position upon movement of a respective mass relative to the detent. Yet another feature is that the spaced shoulders are provided by cutouts in the masses, the one pair of shoulders engaging the detent axially and diametrically opposite of each other to locate the detent in detent position.

Figure 2:
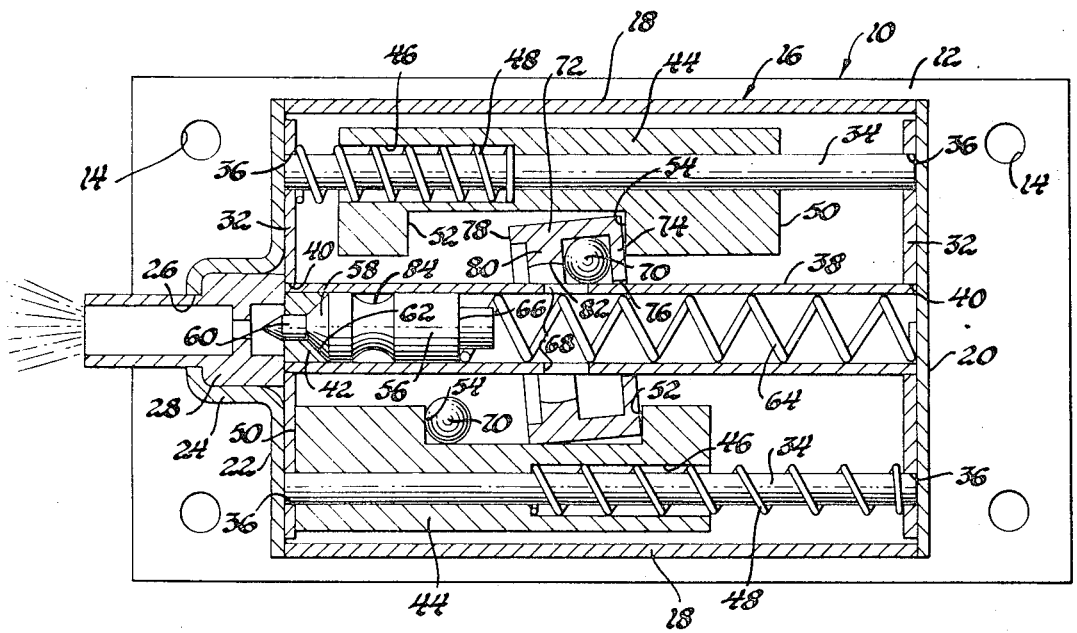

These and other features of the sensor of this invention will be readily apparent from the following specification and drawings wherein:

FIG. 1 is a sectional view of a sensor according to this invention in unactuated condition; and FIG. 2 is a view similar to FIG. 1 showing the sensor in actuated condition.

Referring now particularly to FIG. 1, a sensor 10 according to this invention includes a rectangular base plate 12 provided with a plurality of openings 14 for mounting on a structure subject to acceleration pulses. A housing designated generally 16 includes a pair of rectangular side walls 18 and a pair of rectangular end walls 20 and 22 which are suitably secured to each other and to the plate 12. The major axes of the side walls 18 extend in the same direction as the major axis of the plate 12 while the major axes of the end walls 20 and 22 extend transversely of the plate 12 and in the same direction as the minor axis of the latter. The lower wall of the housing 16 is provided by the plate 12 and the upper wall thereof is provided by a plate, not shown, which is suitably secured to the walls 18, 20 and 22. The end wall 22 includes a central circular boss 24 having an opening 26. A fitting 28 is received within the boss 24 and mounts a conventional primer or cap 30.

Inner end walls 32 seat against and are secured to the inner surface of the walls 20 and 22. A pair of circular pins or rods 34 extend parallel to each other and generally longitudinally of the housing 16 and have their ends respectively piloted in aligned pairs of circular openings 36 of the walls 32. A hollow cylindrical guide tube 38 extends between aligned cylindrical openings 40 of walls 32 and opens at one end to the primer 30 through a fitting 42. The axis of the guide tube 38 is parallel to those of the rods 34.

A pair of generally rectangularly shaped seismic masses 44 are respectively mounted on a rod 34. Each mass is also of rectangular cross section. Each mass includes a central bore receiving a respective rod 34 and including a counterbore 46. A coil compression spring 48 seats between each wall 32 and the base of a counterbore 46 to thereby bias the masses 44 in linear directions oppositely of each other and engage respective end faces 50 of the masses with respective end walls 32 of the housing. Each mass additionally includes a rectangularly shaped cutout providing a first shoulder 52 and a second shoulder 54.

A cylindrical operator 56 is slidably received in the guide tube 38 and includes a tapered radial wall 58 which terminates in a sharp-pointed end 60. When the operator moves from its unactuated position shown in FIG. 1 to its actuated position shown in FIG. 2, the wall 58 and the pointed end 60 are received within a complementary shaped opening 62 of the fitting 42 and the end 60 engages the primer 30 to explode the primer for a purpose to be hereinafter described. The operator 56 is normally biased to its actuated position shown in FIG. 2 by a coil compression spring 64 which seats between one end wall 32 and a shoulder 66 of the operator.

The guide tube 38 includes three equally circumferentially spaced openings 68, each of which receives a respective ball 70. A cylindrical detent member 72 surrounds the guide tube 38 and includes a first radial end wall 74 terminating in a cylindrical opening 76 spaced from the outer surface of the guide tube as shown. The member 72 further includes a second radial end wall 78 and an intermediate radial wall 80 having a shallow arcuate cross section groove 82.

When the sensor 10 is in unactuated position shown in FIG. 1, the balls 70 seat in the groove 82 and in an arcuate cross-section circumferential groove 84 of the operator 56 in order to detent the balls 70 against radial movement and thereby detent the operator in its unactuated position against the action of the spring 64. The detent member 72 is located in its detent position shown in FIG. 1 by the engagement of the shoulder 52 of one mass 44 with the first radial end wall 74 and the diametrically opposite and axially spaced engagement of the shoulder 52 of the other mass 44 with the second end wall 78.

When the sensor 10 is subjected to an acceleration pulse of predetermined amplitude and time directed generally parallel to the axes of the rods 34 and the guide tube 38, one of the masses 44 will move against the bias of its respective spring 48. FIG. 2 shows one of the masses 44 having received a pulse in one direction and thereby moving against the bias of its spring 48. When the mass moves through the distance between shoulders 52 and 54, shoulder 54 engages the first end wall 74 of the detent member 72 to move the detent member slightly to the left to released position wherein the groove 82 thereof is out of engagement with the balls 70. The spring 64 and the groove 84 thereupon cam the balls 70 radially outwardly from engagement with the operator 56 and the operator moves from its unactuated position shown in FIG. 1 to its actuated position shown in FIG. 2. As shown in FIG. 2, the balls 70 may either move to the radial space between walls 74 and 80 or move outwardly of the detent member 72.

Should the pulse be received in an opposite direction, the other of the masses 44 will function in a like manner to move the detent member from its detent position of FIG. 1 to its released position of FIG. 2 to release the operator.

The sensor 10 of this invention is particularly intended for use in a vehicle body occupant restraint system which includes a source of pressure fluid, such as a pressure vessel sealed by a rupturable diaphragm, for inflation of an inflatable occupant restraint cushion when the vehicle body receives a pulse of predetermined amplitude and time. The sensor 10 will be mounted on the body in a manner to receive such pulse. The explosion of the primer 30 may directly rupture the diaphragm of the pressure vessel or actuate a primer cord to effect such rupture. Likewise the operator 58 may close an electrical switch to effect electric detonation and subsequent rupture of the diaphragm or may directly rupture such diaphragm itself.

Thus, this invention provides an improved bidirectional sensor.

I claim:

1. A bidirectional sensor comprising, in combination, a support, an operator mounted on the support for movement between unactuated and actuated positions, means biasing the operator to actuated position, detent means movable between detent and released positions with respect to the operator and holding the operator against movement to actuated position in the detent position thereof, a pair of seismic masses, means respectively mounting each mass on the support for linear movement relative to the detent means, means respectively biasing the masses in opposite linear directions to respective first positions and resisting reverse linear movement thereof to respective second positions upon receipt thereby of an acceleration pulse of predetermined amplitude and time directed generally linearly thereof, coacting means on each mass and the detent means locating the detent means in detent position in the first position of the masses, and coacting means on each mass and the detent means engageable with each other upon movement of either mass to the second position thereof to move the detent means to released position and permit movement of the operator to actuated position.

2. A bidirectional sensor comprising, in combination, a support, an operator mounted on the support for axial movement between unactuated and actuated positions, means biasing the operator to actuated position, detent means movable axially of the operator between detent and released positions with respect thereto and holding the operator against movement to actuated position in the detent position thereof, a pair of seismic masses, means respectively mounting each mass on the support for movement axially of the detent means, means respectively biasing the masses in opposite axial directions to respective first positions and resisting reverse axial movement thereof to respective second positions upon receipt thereby of an acceleration pulse of predetermined amplitude and time directed generally axially thereof, coacting means on each mass and the detent means locating the detent means in detent position in the first position of the masses, and second means on each mass spaced axially of the first means and the detent means and engageable with the detent means upon movement of either mass to the second position thereof to move the detent means to released position and permit movement of the operator to actuated position.

3. A bidirectional sensor comprising, in combination, a support, an operator mounted on the support for axial movement between unactuated and actuated positions, means biasing the operator to actuated position, detent means surrounding the operator and movable axially thereof between detent and released positions with respect thereto and holding the operator against movement to actuated position in the detent position thereof, a pair of seismic masses, means respectively mounting each mass on the support for movement axially of the detent means, means respectively biasing the masses in opposite axial directions to respective first positions and resisting reverse axial movement thereof to respective second positions upon receipt thereby of an acceleration pulse of predetermined amplitude and time directed generally axially thereof, and axially spaced shoulder means on each mass arranged in respective pairs, one pair of shoulder means engaging the detent means and locating the detent means in detent position in the first position of the masses, one shoulder means of the other pair engaging means on the detent means upon movement of the mass respective thereto to the second position thereof to move the detent means to released position and permit movement of the operator to actuated position.

4. A bidirectional sensor comprising, in combination, a hollow tubular support, an operator slidably mounted within the support for movement between unactuated and actuated positions, means biasing the operator to actuated position, an annular detent member circumferentially surrounding the support and movable axially thereof between detent and released positions with respect to the operator, means coacting with the detent member and operator and holding the operator against movement to actuated position in the detent position of the detent member, a pair of seismic masses, means respectively mounting each mass on the support for movement axially of the support and the detent member, and means respectively biasing the masses in opposite axial directions to respective first positions and resisting reverse axial movement thereof to respective second positions upon receipt thereby of an acceleration pulse of predetermined amplitude and time directed generally linearly thereof, each mass including an axially spaced pair of shoulder means, one shoulder means of each pair engaging the detent member axially and diametrically opposite of the other to locate the detent member in detent position in the first position of the masses, the other shoulder means of one mass engaging the detent member upon movement of the one mass to the second position thereof to move the detent member out of engagement with the one shoulder means of the other mass to released position and permit movement of the operator to actuated position.

* * * * *